United States Patent [19]

Wessel et al.

[11] 4,279,146

[45] Jul. 21, 1981

[54] APPARATUS FOR MEASURING THE AIR QUANTITY SUPPLIED TO AN INTERNAL COMBUSTION ENGINE

[75] Inventors: Wolf Wessel, Oberriexingen; Dieter Handtmann, Sindelfinger, both of Fed. Rep. of Germany

[73] Assignee: Robert Bosch GmbH, Stuttgart, Fed. Rep. of Germany

[21] Appl. No.: 63,631

[22] Filed: Aug. 2, 1979

[30] Foreign Application Priority Data

Oct. 3, 1978 [DE] Fed. Rep. of Germany ....... 2843019

[51] Int. Cl.³ .............................................. G01F 1/68
[52] U.S. Cl. ........................................ 73/118; 73/204
[58] Field of Search .......................... 73/204, 116, 118

[56] References Cited

U.S. PATENT DOCUMENTS

| | | | |
|---|---|---|---|
| 3,754,201 | 8/1973 | Adams | 73/204 X |
| 3,928,800 | 12/1975 | Strenglein | 73/204 X |
| 3,995,481 | 12/1976 | Djorup | 73/204 X |
| 4,057,206 | 11/1977 | Duncan et al. | 73/204 X |
| 4,080,821 | 3/1978 | Johnston | 73/204 X |
| 4,196,622 | 4/1980 | Peter | 73/204 |

*Primary Examiner*—Jerry W. Myracle
*Attorney, Agent, or Firm*—Edwin E. Greigg

[57] ABSTRACT

A method for measuring the air quantity supplied to an internal combustion engine by means of a measurement sensor disposed in a bridge circuit having a temperature-dependent resistor (for example, a hot wire or hot film) in the air intake manifold and having a temperature control apparatus, the temperature of the measurement sensor being controlled in an open or closed loop independently of the temperature of the medium to be measured, the properties of the medium to be measured which cause the measurement effect in the hot wire or hot film being dependent on the temperature. With an identical flow quantity but different temperatures in the medium, a correct measurement indication is obtained by making the excess temperature of the hot wire dependent on the temperature of the medium to be measured. The apparatus for open-loop or closed-loop control of this excess temperature contains, in the parallel arm to the quantity measurement device of the bridge circuit, two resistors disposed in sequence, one of which is also disposed in the air intake manifold in order to detect the air temperature, and the total temperature coefficient is set, by means of the selection of the individual temperature coefficients of the two resistors as well as their resistance values, in such a manner that the actual measurement sensor has a controlled excess temperature.

2 Claims, 1 Drawing Figure

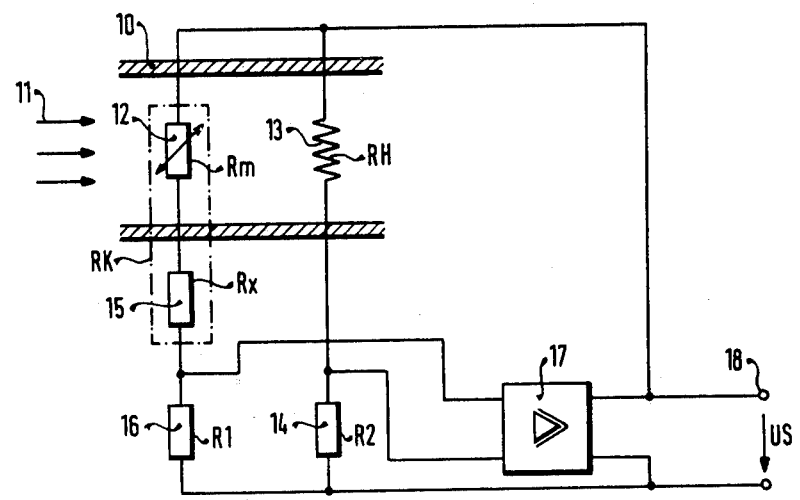

4,279,146

APPARATUS FOR MEASURING THE AIR QUANTITY SUPPLIED TO AN INTERNAL COMBUSTION ENGINE

BACKGROUND OF THE INVENTION

The invention relates to a method and apparatus for measuring the air quantity supplied to an internal combustion engine. A measurement apparatus is already known whose basic structure corresponds to a bridge circuit and a hot wire forms one of the bridge resistors. A resistor disposed in a corresponding position in the other bridge arm comprises two partial resistors, one of which is also disposed in the air intake manifold, so that this one partial resistor, located in series therewith for this purpose is disposed outside the air intake manifold. The voltage between the bridge diagonal is supplied to an amplifier and its output signal represents both a signal pertaining to the air quantity flowing in the air intake manifold and the control signal for the bridge itself. It is the object of the amplifier in the known arrangement to maintain the temperature of the hot wire or or the hot film at a constant value. However, because of this control at a constant temperature, errors in measurement result because the properties of the medium to be measured, that is, the air, are dependent on the temperature.

OBJECT AND SUMMARY OF THE INVENTION

The method according to the invention has the advantage over the prior art in that correct measurement values are furnished even at variable temperatures in the induced air. This is attained by means of an excess temperature in the measurement device adapted to the particular air temperature, so that the particular properties of the air at the different temperatures are taken into consideration.

The invention will be better understood as well as further objects and advantages thereof become more apparent from the ensuing detailed description of a preferred embodiment taken in conjunction with the drawing.

BRIEF DESCRIPTION OF THE DRAWING

One embodiment of the basic structure of the invention is shown in the sample FIGURE of the drawing.

DESCRIPTION OF THE PREFERRED EMBODIMENT

The sample FIGURE in the drawing shows an intake manifold 10 of an internal combustion engine not otherwise shown, in which the air induced by the internal combustion engine flows in the direction of the arrows 11. Located one after another in the intake manifold 10 are two temperature-dependent resistors 12 and 13, with the resistor 12 located at a point having a relatively weak air flow, so that it detects not the flow quantity of the induced air but rather its temperature. In contrast to this, the resistor 13, embodied as a hot wire or hot film is optimally disposed at a location of high air flow, so that its cooling can be evaluated as a standard for the air quantity flowing through the intake manifold. While a single resistor 14 is located in series with the resistor 13, two single resistors 15 and 16 are connected in series with the resistor 12.

A controller 17 receives, as an input signal, the differential signal between the connecting point of the two resistors 15 and 16 and the connecting point between the two resistors 13 and 14. At the output side, the controller 17 is connected both with the output 18 of the measurement apparatus and with the connection point of the two resistors 12 and 13. The circuit arrangement thus represents a resistance measurement bridge and the bridge imbalance may be as a standard for the air quantity flow.

It is now necessary, for a correct measurement result, to maintain the temperature of the resistor 13, in dependence on the temperature of the induced air, to a certain excess temperature. This may be attained through a certain total temperature coefficient of the two resistors 12 and 15 or through a predetermined combination of values of these two resistors.

The following is a computation for determining the values of the two resistors 12 and 15, in order to obtain certain values for the temperature of the resistor 13. In the hot wire equation according to King, $$K \cdot IS^2 \cdot RH = L \cdot (\lambda G + 2\sqrt{\pi \cdot \frac{d}{2} \cdot CV \cdot \rho \cdot \lambda G \cdot V}\ ) T \quad (1)$$

where IS=the sensor current, RH=the hot wire resistance, L=the length of the wire, $\lambda$G=the heat conductance of the air, d=the wire diameter, CV=the specific heat capacity of the air, $\rho$=air density, V=air velocity, T=the differential temperature of air/wire, and K=a factor, values are included which are dependent on the air temperature. $\lambda$G becomes larger at a higher air temperature, and RH will adjust to a different value at a different air temperature in the circuit arrangement utilized.

The measurement sensor is intended to require an identical heat flow at identical air quantities with different air temperatures, so that the trigger signal of the measurement bridge may be evaluated as a correct air quantity measurement signal. Rewritten, the equation (1) is:

$$IS^2 = \frac{L \cdot \lambda G \cdot T}{K \cdot RH} + \frac{2L}{K \cdot RH} \sqrt{\pi \cdot \frac{d}{2} \cdot CV \cdot \rho} \cdot \sqrt{\lambda G} \cdot T \cdot \sqrt{V}$$

Thus, at a certain outset temperature TO (for example 0° C.), the following applies:

$$ISO^2 = \frac{L \cdot \lambda GO}{K} \cdot \frac{TO}{RHO} + \frac{2L}{K} \cdot \sqrt{\pi \cdot \frac{d}{2} \cdot CV \cdot \rho} \cdot \sqrt{\lambda GO} \cdot \frac{TO}{RHO} \cdot \sqrt{V}$$

With symbols of abbreviation, the result is $$ISO^2 = AO' + BO' \cdot \sqrt{V} \text{ where}$$

$$AO' = A \cdot \lambda GO \cdot \frac{TO}{RHO} = A \cdot \lambda GO \cdot a$$

$$BO' = B \cdot \sqrt{\lambda GO} \cdot \sqrt{V} \cdot \frac{TO}{RHO} = B \cdot \sqrt{\lambda GO} \cdot \sqrt{V} \cdot a$$

At a different air temperature, elevated by the amount $\theta$, the equation then applies as follows:

$$ISI^2 = A \cdot \lambda G\theta \cdot \frac{TI}{RH1} + B \cdot \sqrt{\lambda G \theta} \cdot \frac{TI}{RH1} \cdot \sqrt{V}$$

$$= A \cdot \lambda G \theta \cdot b + B \cdot \sqrt{\lambda G \theta} \cdot b \cdot \sqrt{V}$$

In accordance with the requirement that at identical air quantities the indication should be identical, that is:

$$ISO^2 = ISI^2$$

from which the following is derived:

$$b = a \cdot \frac{A \cdot \lambda GO + B \cdot \sqrt{\lambda GO} \cdot \sqrt{V}}{A \cdot \lambda G\theta + B \cdot \sqrt{\lambda \cdot G\theta} \cdot \sqrt{V}}$$

If, accordingly, the hot wire curve $ISO^2 = AO' + BO' \cdot \sqrt{V}$ is present, then with the known values for $\lambda GO'$ of a certain air velocity V and the selected values TO and RHO the value b can be computed for the air temperature, wherein the following applies:

$$RHO = RO(1 + \alpha TO)$$

At the air temperature $\theta$, the hot wire has the excess temperature T1. The hot wire resistance is thus $$RH1 = RO[1 + \alpha(T1 + \theta)]$$

Furthermore, $$b = \frac{TI}{RH1} = \frac{TI}{RO + \alpha \cdot RO \cdot (T1 + \theta)} \qquad (3)$$

$$T1 = \frac{b \cdot RO \cdot (1 + \alpha\theta)}{1 - b \cdot \alpha \cdot RO}$$

With equation (3) it is thus known what excess temperature must be set at the hot wire at a different air temperature $\theta$, in order to produce at the identical air quantity the identical flow indication such as ISO.

This value of TI was computed, assuming the following:

| | |
|---|---|
| outset temperature: | = 0° C. |
| $\theta$ | = 50° C. |
| TO | = 200° C. |
| RO | = 100 ohm |
| $\alpha$ | = 0.0039/C.° = constant |
| RHO | = 1.78 ohm |
| $\lambda$ GO | = 0.0209 kcal/m . h . grd |
| $\lambda$ G$\theta$ | = 0.0239 kcal/m . h . grd |

The result was $$\left(\frac{ISO^2}{A}\right) = 0.5626 + 0.3606 \cdot \sqrt{V/\frac{m}{sec}}$$

At a flow identity for V/m/sec = 30 (medium partial load) the result was:

T1 = 207.3334° C.

The error of ISI was thus, at

| | |
|---|---|
| V/m/sec = 10: | +3.7 o/oo |
| = 20: | +1.2 o/oo |
| = 30: | ±0 |
| = 40: | −0.82 o/oo |
| = 50: | −1.4 o/oo |
| = 60: | −1.8 o/oo |

From TI and $\theta$, the necessary resistor combinations may be ascertained for the bridge shown in the drawing, whereby the two resistors 12 and 15 are brought together to form one resistor RK.

Bridge balance is present for RK/R1 = RH/R2.

The balance for the resistors at an outset temperature is $$RKO/R1 = RHO/R2 \qquad (4)$$

and for an air temperature of $\theta$ the balance is $$RK\theta/R1 = RH1/R2 \qquad (5)$$

By converting, the result is $$RK\theta = RH1/RHO \cdot RKO = C \cdot RKO$$

Because the resistor RK is put together from the resistor Rm having the temperature coefficient $\alpha m$ and the resistor Rx having $\alpha x = 0$, that is, from the resistors 12 and 15, the following result in obtained:

$$RKO = Rx + Rmo$$

$$RK\theta = Rx + Rmo(1 + \alpha m \cdot \theta)$$

Substituted in (6), $$Rx + Rmo \cdot \alpha m\theta = c \cdot Rx + c \cdot Rmo$$

$$Rmo(1 + \alpha m\theta - c) = Rx(c - 1)$$

$$\frac{Rmo}{Rx} = \frac{c - 1}{1 + \alpha m \cdot \theta - c}$$

In the present case it is now assumed that Rm, just like RH, is manufactured of platinum with $\alpha = 0.0039$ per degree C. Thus, at an air temperature $\theta = 50°$ and TI = 208° C., $$RH1 = RO[1 + \alpha \cdot (T1 + \theta)] =$$
$$1 \text{ ohm } (1 + 0.0039/° C. \cdot 258° C.) = 2/0062 \text{ ohm}$$

$$c = \frac{RH1}{RHO} = \frac{2.0062}{1.78} \frac{\text{ohm}}{\text{ohm}} = 1.1271$$

and thus $$\frac{Rmo}{Rx} = \frac{0.1271}{1 + 0.0039/° C. \cdot 50° C. - 1.127} = 1.871$$

This results in $$Rx = RKO/\left(1 + \frac{Rmo}{Rx}\right)$$

If the value selected for RKO = 100 ohm, then the two resistors must be Rx = 34.831 ohm and Rmo = 65.169 ohm.

The value determining rules given above provide for a variable excess temperature of the hot wires as the resistor 13 of the single FIGURE of the drawing. The calculations further make clear the correct result of an air quantity measurement in the case of a measurement resistor held at a variable excess temperature. By means of the value determining rules given above, an air quantity meter for internal combustion engines can be produced which functions in an extremely accurate manner.

The foregoing relates to a preferred embodiment of the invention, it being understood that other embodiments and variations thereof are possible within the spirit and scope of the invention, the latter being defined by the appended claims.

What is claimed and desired to be secured by Letters Patent of the United States is:

1. An apparatus for measuring the air quantity supplied to an internal combustion engine having an air intake manifold comprising, in combination, a bridge circuit comprising a first bridge arm and a second bridge arm and having a measurement sensor disposed in said air intake manifold, a measurement resistor, said measurement sensor and said measurement resistor being connected in series and disposed in said first bridge arm, three resistors disposed in said second bridge arm, a first resistor of said three resistors being located in said air intake manifold for the purpose of detecting the temperature of the medium to be measured and being connected in series with a second resistor of said three resistors to form a series combination which is connected in series with a third resistor of said three resistors, said apparatus further comprising a temperature control means for controlling the temperature of said measurement sensor to maintain the voltage at the connection of said measurement sensor and said measurement resistor essentially equal to the voltage at the connection of said series combination and said third resistor, said first and second resistors having different temperature coefficients and having resistance values such that a controllable excess temperature beyond the temperature of the medium to be measured is produced at said measurement sensor by said temperature control means independently of the temperature of the medium to be measured.

2. An apparatus for measuring the air quantity supplied to an internal combustion engine having an air intake manifold, which comprises:

a bridge circuit having first and second bridge arms connected in parallel between respective first and second bridge inputs, said first bridge arm including a first bridge output, a first temperature-dependent resistor or air flow measurement sensor disposed in said air intake manifold at a point of relatively high air flow and connected between said first bridge input and said first bridge output, and a first resistor connected between first bridge output and said second bridge output, said second bridge arm including a second bridge output, a second temperature-dependent resistor or air temperature measurement sensor disposed in said air intake manifold at a point of relatively weak air flow, a second resistor connected in series with said air temperature measurement sensor between said first bridge input and said second bridge output, and a third resistor connected between said second bridge output and said second bridge input;

control means for supplying an output signal to said bridge inputs to maintain the voltage between said first bridge output substantially equal to the voltage between said first bridge input and said second bridge output;

wherein said air temperature measurement sensor and said second resistor have different temperature coefficients and resistance values such that the output signal of said control means is substantially independent of changes in the air temperature and changes in the heat conducting properties of the air caused by said air temperature changes.

* * * * *